United States Patent [19]

Van Eenam

[11] 4,412,017
[45] * Oct. 25, 1983

[54] COMPOSITIONS FOR BONDING FIBROUS SUBSTRATES

[75] Inventor: Donald N. Van Eenam, Des Peres, Mo.

[73] Assignee: Monsanto Company, St. Louis, Mo.

[ * ] Notice: The portion of the term of this patent subsequent to Dec. 29, 1998, has been disclaimed.

[21] Appl. No.: 270,933

[22] Filed: Jun. 5, 1981

Related U.S. Application Data

[63] Continuation-in-part of Ser. No. 121,849, Feb. 15, 1980, Pat. No. 4,308,187.

[51] Int. Cl.³ .............................................. D21H 3/44
[52] U.S. Cl. .............................. 523/408; 162/168.1; 524/523; 524/525

[58] Field of Search ............... 260/29.7 NR, 29.7 RP, 260/29.7 D, 29.7 DP, 29.7 UA, 29.7 W, 29.7 WA, 29.7 UP; 162/168 R; 523/408; 525/525

[56] References Cited

U.S. PATENT DOCUMENTS

| 3,431,227 | 3/1969 | Kastning | 260/29.7 DP |
| 4,033,920 | 7/1977 | Isozaki et al. | 260/29.6 H |
| 4,049,634 | 9/1977 | Ko et al. | 260/27 R |
| 4,145,248 | 3/1979 | Van Eenam | 162/168 R |

*Primary Examiner*—Paul R. Michl
*Attorney, Agent, or Firm*—David Bennett; W. J. Farrington; E. P. Grattan

[57] ABSTRACT

Compositions suitable for bonding fibrous substrates comprise a liquid hydrophilic air-curing polymer and an unsaturated thermoplastic polymer latex.

12 Claims, No Drawings

COMPOSITIONS FOR BONDING FIBROUS SUBSTRATES

BACKGROUND TO THE INVENTION

This is a continuation-in-part of U.S. application Ser. No. 121,849 filed Feb. 15, 1980 now U.S. Pat. No. 4,308,187 issued Dec. 29, 1981.

The parent application relates to novel latex compositions that can be used to bond fibrous substrates so as to impart to the substrate desirable properties such as wet and dry strength, soft handle, stain resistance, permanent crease and permanent press characteristics and the like depending on the character and proportions of the components present in the composition.

For example when a paper mat is made by a moder airlaid process, the component fibers are only loosely tangled together and have little natural cohesion. Before such mats can be processed into commercial items such as paper towels or facial tissues, they must be treated chemically and/or mechanically to give them the greater strength required for such uses. The versatile nature of the chemical treatment route leads to it being preferred over a purely mechanical treatment since by selection of the treating composition, certain desirable properties such as softness or handle can be maintained, enhanced or created.

The compositions described in the parent application are very useful for treating fibrous substrates, especially cellulosic substrates, and have particularly advantageous dispersibility and strength-enhancing properties and exhaust relatively easily onto a dry laid web in a uniform and efficient manner. The compositions are also effective as a wet-end additive for the generation of wet and dry strength in a paper-making process as well as in a plurality of non fiber-related applications such as in coating compositions.

The present invention relates to a particular variety of latex composition with unexpectedly advantageous properties.

DISCUSSION OF THE PRIOR ART

In the enhancement of the strength, e.g. of dry laid cellulosic webs it is conventional to apply a latex of a polymer that can undergo a heat-set curing or thermolysis reaction such that the polymer bonds the fibers together and gives coherence.

It is also known that polymers containing a plurality of olefinic unsaturations can undergo a cross-linking reaction by an air-curing or free-radical induced cross-linking mechanism. One specific group of polymers that are essentially hydrophilic and which very readily undergo a highly efficient air-curing reaction is described in U.S. Pat. No. 4,145,248. These air-curing polymers have been proposed as additives for cellulosic substrates particularly as wet strength additives and as textile-treating agents for improved performance.

However both types of additive have certain drawbacks when used to treat substrates such as air-laid cellulosic mats, fibrous textiles and the like. For example the thermoplastic polymer latices have to be applied in large quantities in order to be effective because of the relatively inefficient transport of the particulate solid latex particles through the substrate resulting in either the need for an excessive level of addition or treatment only of the surface of the substrate. Furthermore they tend to impart only dry tensile strength with minimal improvement in wet tensile strength.

The air-curing polymers are hydrophilic and are more efficient at penetrating a substrate largely because they have good flow along the fiber surfaces. They do tend however to be somewhat expensive to use if a thick, loosely compacted mat is involved. In addition they generate comparatively minor improvements in dry strength.

A composition has now been discovered that provides a relatively low cost but hightly efficient way of providing, for example, an air-laid cellulosic fiber mat or a non-woven loosely-bonded, fibrous textile substrate with cohesion, wet and dry strength and, if desired, a wide range of other desirable properties. Moreover the composition is lower in cost than the best air curing polymers while being much more efficient than the best latices.

The composition can also be used as a wet-end additive in a conventional paper making process. Besides paper related uses the compositions of the invention can also be used on woven and non-woven textile fabrics of non-cellulosic materials and as a crosslinking aid for coating compositions such as latex-based paints or even oil based paints.

DESCRIPTION OF THE INVENTION

U.S. Pat. No. 4,308,187 describes a composition having a water wicking time of less than 30 seconds comprising:

A. from 5 to 95% by weight, of a thermoplastic polymer in the form of solid, stably dispersed latex particles, and B. from 95 to 5% by weight of a liquid hydrophilic polymer having a backbone comprising at least one segment with the formula

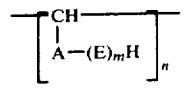

wherein A is a moiety terminating in the residue of an active hydrogen-containing group selected from the group consisting of alcoholic hydroxyl, thiol, amide, carboxylic acid, and secondary amine with an active hydrogen removed; E is a moiety containing a radical having an activated olefinic unsaturation either $\alpha$, $\beta$ or $\beta,\gamma$ to the activating group; n is the number of adjacent segments having this formula and n and m are integers and are each at least 1 provided that where either is less than 4, the other is at least 4; all the weight being based on the total polymer weight in the composition.

The present invention provides a composition comprising:

A. from 5 to 99.5% by weight of a thermoplastic predominantly linear polymer with intralinear unsaturated linkages in the form of solid stably dispersed latex particles; and B. from 95 to 0.5% by weight of a liquid hydrophilic polymer having a backbone comprising at least one segment with the formula

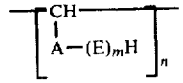

wherein A is a moiety terminating in the residue of an active hydrogen-containing group selected from the group consisting of alcoholic hydroxyl, thiol, amide, carboxylic acid, and secondary amine with an active hydrogen removed; E is a moiety containing a radical having an activated olefinic unsaturation either $\alpha$, $\beta$ or $\beta,\gamma$ to the activating group; n is the number of adjacent segments having this formula and n and m are integers and are each at least 1 provided that where either is less than 4, the other is at least 4; all the weight being based on the total polymer weight in the composition.

It has now been found that the Component B polymers can act as highly efficient initiators of free-radical polymerization. Thus unsaturated latices can actually be crosslinked by the use of such polymers to give highly efficient formulations for treating fibrous substrates to give them wet and dry strength.

It has moreover been found that, when the latex comprises pendant hydrophilic groups such as carboxylic acid groups, a great improvement in hydrophilicity of the treated substrate is observed.

COMPONENT A

Component A is a predominantly linear thermoplastic polymer having a plurality of intra-linear unsaturated linkages, in the form of solid stably-dispersed latex particles.

It is recognized that, if the Component A is somewhat hydrophobic, the overall hydrophilicity of the composition of the invention can be adjusted using a suitable surfactant. Compositions comprising a hydrophobic polymer and a surfactant are therefore embraced within the purview of this invention.

It is preferred that the polymer be a homopolymer or a copolymer of a diene monomer such as butadiene (any isomeric form including cis or trans 1,4 and 1,2 isomers), chloroprene or isoprene. Specific examples of suitable unsaturated polymers that can provide the Component A include: polybutadiene, styrene/butadiene copolymer, butadiene/acrylonitrile copolymer, polychloroprene, polyisoprene, and EPDM rubbers. The polymer can also be grafted with a polymeric superstrate as for example in an ABS polymer. Particularly useful polymers are those that comprise pendant carboxylic acid functions, even as low as 1% by weight since these significantly improve the hydrophilic character of substrates treated with the composition of the invention.

In addition to the intralinear unsaturations the polymer providing Component A can have extra-linear or pendant unsaturations for example in the form of allyl vinyl or acrylic groups.

The carboxylic function can be incorporated into the latex by the copolymerization of an acrylic or methacrylic acid with the other components, by a suitable grafting operation, or by polymeric anion reaction with carbon dioxide.

Other highly hydrophilic functions can if desired be substituted for the carboxylic acid function provided they do not interfere with the air-curing of Component B.

Component A is usually employed in the form of a latex comprising dispersed polymer particles with a weight mean average diameter of from 0.05 to 2.0 micron and preferably from 0.2 to 0.8 micron.

Component A latex can if desired be stabilized by a surfactant system that may or may not be identical to any emulsion stabilizer used in connection with Component B. The amount of each surfactant will depend greatly on both latex and emulsion properties and structures. Each resin has its own emulsifier need and either an excess or a deficiency can lead to a break in the stability of either. In general however, from 1 to 3 percent by weight (based on resin solids) of the surfactant may be required. If a surfactant is used it should preferably be of the anionic or non-ionic variety so as to avoid de-stabilizing interactions. The use of protective colloids such as polyvinyl alcohol, carboxymethyl cellulose, hydroxyethyl cellulose and the like may often be very advantageous as viscosity enhancers for the aqueous phase as well as for stabilizing the emulsion of Component B.

A Component A latex usually contains from 20 to 60 percent by weight of the polymer but less may be appropriate if the Component B is added directly as an oil.

It is of course not necessary that Component A be employed directly as a latex. In some instances a polymer melt can be added to an emulsion of Component B and dispersed such that the mixture comprises stably dispersed solid particles of Component A and stably dispersed liquid droplets of Component B. Solutions of the polymer in an organic solvent can also be used in the generation of a suitable latex of Component A.

The dispersion medium is most conveniently water but this is not essential since the chief function of the liquid is to aid application to, and transport of the composition through, any fibrous substrate to which it may be applied. In the case of a hydrophilic substrate it would clearly be desirable to use a hydrophilic dispersion medium.

COMPONENT B

As indicated above, Component B is an air-curing polymer that is a hydrophilic liquid and can be added directly as the polymer, an aqueous dispersion or as a true emulsion.

Component B is a hydrophilic polymer having a backbone comprising at least one segment with the formula:

where A is a moiety terminating in the residue of an active hydrogen-containing group selected from the group consisting of alcoholic hydroxyl, thiol, amide, carboxylic acid and secondary amine with an active hydrogen removed, E is a moiety containing a radical having an activated olefinic unsaturation, either $\alpha,\beta$ or $\beta,\alpha$ to the activating group, n is the number of adjacent (as the term is hereinafter defined) segments having this formula, and n and m are integers and are each at least 1, provided that where one is less than 4 the other is at least 4.

The polymers can have a plurality of adjacent segments of the above formula and by "adjacent" is meant that they are directly connected through a carbon-carbon bond or are indirectly connected through a

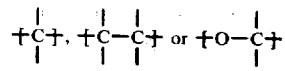

group or an oxygen or sulfur atom.

The effectiveness of the polymers depends to a large extent on the provision of a plurality of activated double bonds which are spatially closely related. These double bonds are sites at which oxygen-initiated crosslinking takes place during the drying or accelerated or natural aging operation. Thus, the provision of blocks of activated double bonds each of which can provide a bond site, increases the potential crosslinking density as well as the structural strength of the crosslinks that form both inter- and intra-molecularly during drying and/or aging.

The double bonds are activated, by which is meant that by virtue of their proximity in the polymer molecule to other strongly electron-donating groups, they are more ready to form crosslinks during the air curing process. Examples of such electron-donating groups include ether, sulfide, hydroxyl, carboxyl, and olefinically unsaturated groups. The preferred electron-donating group is an ether group.

The crosslinking mechanism is similar to that by which many paints based on so-called "drying oils" form a hard tough skin when they dry. Such paints may contain one or more hydrophobic triglyceride esters of various unsaturated fatty acids and "curing" occurs by reaction of an oxygen molecule with one or more intra-linear unsaturation to form a peroxide-type bridge between the two unsaturated sites. The more unsaturation there is in the acid, the more rapidly curing occurs. The best are derived from acids such as tung oil derivatives with multiple conjugated unsaturations. The crosslinking occurs both intra- and intermolecularly.

As has been indicated earlier, it is necessary that the polymer be hydrophilic. Certain of the suitable polymers are completely soluble in water. This may be achieved by the choice of the backbone compound but it may also be the result of the selection of an appropriate molecular ratio of backbone compound to the reactant affixing the pendant unsaturation to the backbone. Alternatively, the introduction of highly water-solubilizing anionic groups such as sulfonate, carboxyl, quaternary ammonium, sulfonium, phosphonium, isothiouronium and other similar cationic groups; or the incorporation of a plurality of nonionic ether oxygen atoms or hydroxyl groups can be used to achieve water solubility or emulsifiability.

The description of the polymer as "hydrophilic" is therefore, to some extent, a reflection of the ratio of oxygen to carbon in the polymer. Generally, the greater the ratio the more hydrophilic is the polymer. However, hydrophilicity is best observed by the behavior of water placed on a fibrous surface that is normally absorbant (i.e. which is unmodified with additives that would destroy its porosity) that has been treated with the polymer. A hydrophobic polymer such as a drying oil-based paint causes the water to run off or form discrete droplets on the fibrous surface which, in effect, is waterproofed. A hydrophilic polymer on the other hand, allows the surface to become wetted and, if of a porous material, allows the water to be absorbed into the material by a "wicking" effect.

Qualitatively therefore, the term "hydrophilic" polymer is understood to describe a polymer that can be applied to an unmodified cellulosic substrate without causing water applied to the treated substrate to run off or form discrete droplets. It is also applied to the polymer when cured on the substrate with the above effect. In other words, the polymer does not destroy the power of the substrate to absorb water or to be wetted by it.

Quantitatively it is found that hydrophobic polymers have a surface energy of about 40 dynes or less (water has a surface energy of 72 dynes). "Hydrophilic" polymers suitable for imparting wet/dry strength to cellulosic substrates, have a surface energy of at least 50 and an unmodified cellulosic substrate treated therewith has a surface energy of at least 65 dynes.

The polymers can be formed by the reaction of a compound having an activated double bond and epoxy group with a molecule having a plurality of active hydrogen-containing groups selected from alcoholic hydroxyl, thiol, amide and carboxylic acid but not primary amine groups. Since it is also desirable that the polymer be hydrophilic it is often preferred that hydroxyl groups should provide the active hydrogen-containing groups. The polymer should not contain primary or secondary amine groups or phenolic hydroxy groups since such groups interfere with the curing reaction.

The polymers can for example, be prepared by the reaction of a backbone compound having at least one and preferably from 1 to 6 moieties containing active hydrogen-containing groups with a compound containing both an epoxide group and an activated double bond in proportions such that from 1 to 20 epoxide radicals are provided for each active hydrogen-containing groups on the backbone compound and the polymer produced has at least one block of at least four adjacent activated double bonds.

Alternatively, a polymer chain having a plurality of adjacent pendant hydroxyl groups can be reacted with, for example, allyl chloride using the techniques of Williamson's ether synthesis. Alternatively, the same Williamson synthesis technique may be employed using a polymer chain with pendant halogen atoms and an unsaturated alcohol such as allyl alcohol. This results in the generation of adjacent allyloxy groups pendant from the polymer backbone that can form a suitable block of unsaturation conferring the desired air-curing characteristics on the polymer.

Yet another method by which the polymer may be prepared is by the Lewis acid promoted polymerization of vinyl allyl ether. This reaction is selective to the vinyl group and results in a chain of carbon atoms with an allyloxy group pendant from every other carbon atom.

There are, therefore, two basic types of polymer embraced by the formulation above. The first type comprises a backbone molecule with as little as one moiety containing an active hydrogen-containing group which is reacted with a compound containing an epoxy group and an activated terminal double bond in proportions such that there are at least four and preferably from 4 to 10 or even 20 epoxy groups per active hydrogen-containing group. As a simple example the polymer obtained by reacting 1 mole of glycol with 8 moles of allyl glycidyl ether produces a polymer having the average structure

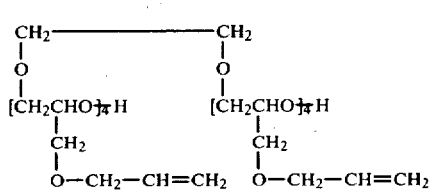

thus providing two blocks of four adjacent allylic groups—assuming of course, uniform addition at both sides. In this compound the moiety A in formula (I) is —O— and the moiety E is

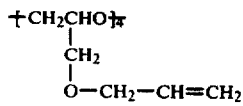

and has the double bond β,γ to the activating oxygen group.

The other type of structure is obtained for example, when a backbone molecule which comprises at least four adjacent active hydrogen-containing groups is reacted with an unsaturated epoxy compound as described above or alternatively, using Williamson's ether synthesis, with allyl chloride to produce a block of pendant allylic groups. In this case the ether oxygen provides the activation for the double bond in the allyl group and also the group "A". An example of such a product is that produced by the reaction of allyl chloride with polyglycidol to produce a polymer having structure with repeating units of the formula

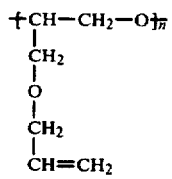

Here the moiety A in formula (I) is $+CH_2O+$, the moiety E is $+CH_2—CH=CH+$ and m is 1 and n is at least 4, the olefinic unsaturation is β,γ to the activating oxygen.

The backbone compound can therefore, be a polymeric polyol such as polyethylene glycol, polyglycerol, polyglycidol, polyvinyl alcohol, a partially hydroxyed polyvinyl acetate, a styrene/allyl alcohol copolymer, poly(2-hydroxyethyl acrylate), poly(vinyloxyethanol), a monomeric polyol such as sorbitol, mannitol, or ethylene glycol; a monomeric alcohol such as allyl alcohol, the corresponding thiols; and dicarboxylic acids such as fumaric acid, maleic acid, malonic acid and phthalic acid. Also, compounds containing a mixture of radicals can be used such as hydroxy acids, which are compounds containing the carboxyl and hydroxyl radicals, hydroxy amides, hydroxy ethers, hydroxy esters, and the like. However, polyhydric alcohols having from 4 to 6 carbon atoms are preferred and sorbitol is especially preferred.

The epoxy compound reacted with the backbone compound comprises an epoxide group and an activated double bond.

The epoxy compounds that can be used have the general formula

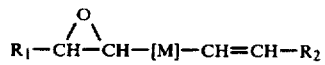

wherein M is absent or is a group capable of activating the double bond such as for example the following

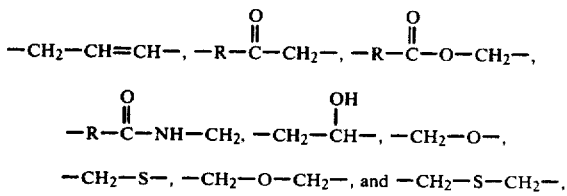

wherein R is a $C_1$ to $C_4$ alkylene group and $R_1$ and $R_2$ are each hydrogen or $C_1$ to $C_4$ alkyl groups. The corresponding episulfides may also be used.

It is important that the activating group does not comprise a moiety that will inhibit or deactivate the air-curing mechanism. Such disfavored groups include free primary and secondary amine, phenolic hydroxyl and aldehyde groups.

Preferred compounds include allyl glycidyl ether, sorbyl glycidyl ether, butadiene monoxide and vinyl cyclohexene monoxide. The most preferred reactant which is also readily available at relatively low cost is allyl glycidyl ether.

One particularly preferred feature is the use of an allyl glycidyl ether reaction product obtained by the reaction of a small excess of epichlorohydrin with allyl alcohol. The allyl glycidyl ether reaction product has the empirical formula:

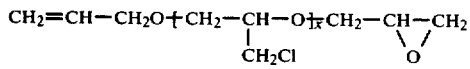

where x is a fraction up to 0.5, usually about 0.25.

It is preferred that the above reaction product is dried before used such that it contains less than 0.1% by weight of water which would otherwise give rise to undesirable side reactions.

This preferred feature is not confined to the specific allyl glycidyl ether reaction products described above. Expressed more generically, preferred polymer of the invention that can be produced using such products have the formula:

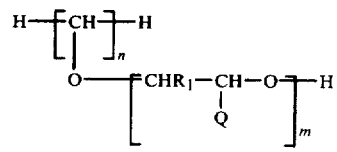

where n is an integer which is preferably from 2 to 6; m is an integer which is preferably from 6 to 10 with the proviso that where either of m or n is less than 4 the other is at least 4; $R_1$ is hydrogen or a $C_1$ to $C_4$ alkyl group; and Q is a moiety with the empirical formula:

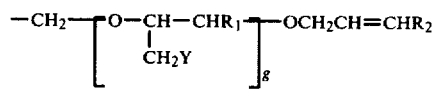

where g is a fraction up to 0.5; Y is halogen or, in the event the halogen has been replaced by a quaternary group, an ammonium, phosphonium or sulphonium radical and $R_2$ is hydrogen or a $C_1$ to $C_4$ alkyl group.

The product of the reaction between the halogen-containing allyl glycidyl ether reaction product and the active hydrogen-containing backbone compound will therefore have a number of pendant—$CH_2Cl$ groups which may be reacted with a tertiary amine such as trimethylamine to form a quaternized amine derivative and therefore, a number of cationic charges on the polymer molecule. This makes the adsorption onto cellulosic substrates more efficient. Conversely, the —$CH_2Cl$ group can be converted into a carboxyl, sulfonic, or other anionic group and this is often beneficial if the emulsifying surfactant type is anionic. Both external emulsifying surfactant and charge type on the polymer undergoing emulsification should preferably be the same.

Often the introduction of a relatively modest number of charged groups is enough to improve the dispersibility of the polymer in aqueous solutions to the extent of rendering the polymer readily emulsifiable or even soluble in water.

An alternative method of introducing ionic groups is to form a derivative of the hydroxyl group at the end of a chain of polymerized glycidyl groups that can be converted to a quaternary group or carboxyl group. For example, an epoxy group can be formed thereon and this may then be condensed with a tertiary amine to produce a quaternary ammonium group with the same general result as has been determined above.

The reaction of the epoxy compound with the backbone molecule can take place under the influence of an acid catalyst, preferably a Lewis acid such as boron trifluoride, antimony pentafluoride, tin tetrachloride, phosphorus pentafluoride, zinc fluoborate or anhydrous hydrogen fluoride. Alternatively, but less preferably a Lewis base such as sodium hydride or potassamide can be used. The temperature at which the reaction is performed is generally from 0° to 120° C. and preferably from 0° to 80° C.

Air-drying of the polymers is much accelerated by the presence of traces of heavy metal salts including for example, cobalt acetate, cobalt octoate, manganese acetate and other organic salts of transition metals known to be capable of functioning as "metallic driers" in the paint field. Organic peroxides such as benzoyl peroxide and similar hydroperoxides are also found to be effective either alone or in conjunction with the metallic driers described above.

The incorporation of from 0.001 to 0.1% by weight of such a soluble salt along with the polymer is a preferred feature.

Often it is desirable that the viscosity of a polymer solution be increased (or "bodied") prior to addition to the latex. An increase of viscosity can be achieved merely by passing air through the polymer itself or a solution or emulsion of the polymer so as to initiate viscosity building by an air-curing mechanism. By careful control of the amount of air used, an exact modification of the polymer viscosity can be achieved. Before substantial air-bodying has occurred the polymer is styled an oxidative prepolymer. After air-bodying however it may be referred to as an oxidative prepolymerizate.

While certain viscosifiers such as polyvinyl alcohol can be used for the same purpose, care must be taken to ensure that the viscosifier selected does not reduce the ease with which the polymer can translocate to the polymer cross-over points before cure. Air treatment also is effective in reducing very substantially the time needed to achieve a cure of the polymer.

THE COMPOSITIONS

It is preferred that the compositions of the invention be hydrophilic in nature to aid in the application to a substrate such as a cellulose-based material. Hydrophilicity is most conveniently defined in terms of the "water wicking time" of a substrate treated with the composition and dried.

The "water wicking time" may be determined by applying the composition in the form of an aqueous dispersion to a Whatman #1 filter paper at a 10% weight/weight ratio, drying the paper at 120° C. for 10 minutes in a circulating air oven drier and then dropping on to the center of the horizontally positioned paper a 0.10 ml. drop of water at 22° C. and measuring the time for the drop to disappear. The end point is determined by the disappearance of the gloss indicating that no water film remains on the surface. The speed with which this occurs is a function of the speed with which the water is dissipated through the paper by the wicking effect and thus in turn is controlled by the hydrophilicity of the fibers. If therefore a cellulosic paper substrate (which is naturally very hydrophilic) is treated with a hydrophobic composition, the water will tend initially to "bead" rather than be absorbed and spread through the paper. Thus, the "water wicking time" is a very effective technique for assessing the hydrophilicity of a composition by a practical and easily performed test.

The composition of the invention can comprise stably dispersed solid particles of the thermoplastic polymer and liquid droplets of the hydrophilic polymer also stably dispersed in the same dispersion medium, usually water.

Alternatively the hydrophilic polymer may actually be present in the solid particles of the thermoplastic polymer either by penetration of the particles or occlusion or perhaps even as a coating on the surface of the polymer particles.

The blend of components A and B is preferably achieved by slowly adding with stirring the latex, Component A, to the air-curing polymer, Component B, at ambient temperatures. The rate of addition that is appropriate depends largely on the nature of the polymers but it is usually found that if the addition is too rapid, coagulation of latex may occur. Use of a protective colloid often increases the mechanical as well as the chemical stability of the blend.

The air-curing polymer can, as has been indicated above, be present in the form of the liquid polymer or as an emulsion. Where it is added to the latex directly it is often convenient to add at the same time a suitable emulsifier to aid in a coarse dispersion of Component B and to facilitate its ad- or absorption into the latex. In effect this technique brings about the self-emulsification of Component B.

Air curing polymers commonly employ a heavy metal salt as a drier and this too may be added at this stage. Incorporation of these salts does not usually lead to premature cross-linking while the polymer/latex combination exists so that the shelf life is not greatly reduced by including the drier even at this early stage.

The formation of the composition of the invention is carried out by preference at room temperature and standard pressure though higher or lower pressures or temperatures may be used.

An alternative approach is to introduce a melt of the Component A polymer, if necessary together with a suitable dispersing agent, into an agitated emulsion of Component B.

The composition of the invention is commonly applied to a substrate as an emulsion with a 5–25% by weight polymer content though greater or smaller polymer contents, for example from 2 to 60% or preferably from 5 to 40% by weight, are permissible.

The proportions of the two Components A and B can be varied as required to meet a desired blend of properties. Usually however the ratio of Component A to Component B on a polymer weight basis can be from 5:95 to 99.5:0.5. Preferably however the weight ratio of A to B is from 20:80 to 99:1.

The composition of the invention is kept stable by excluding air. This can be done by sealing containers under an inert gas but usually the amount of air present in the space above the liquid in a conventional container is not enough to reduce the shelf life of the composition to an intolerably low level.

In many circumstances it is desirable to increase the viscosity of the composition by adding an additive such as polyvinyl alcohol in an amount of up to 2% by weight based on the air-curing polymer weight. While polyvinyl alcohol is the preferred viscosity modifier on account of its hydrophilic character, other modifiers that would not interfere with the stability or efficiency of the system can clearly be used. It is found, surprisingly, that viscosity modifiers give an increase in the viscosity of the aqueous phase and stabilize an emulsion of air-curing polymer droplets without deleteriously affecting the efficiency of the composition when applied to a substrate.

Other non-interferring additives such as processing aids, surfactants, stabilizers, pigments and the like can be incorporated in the composition of the invention if desired.

DESCRIPTION OF PREFERRED EMBODIMENTS

The invention is now more particularly described with reference to the following Examples which are for the purpose of illustration only and are intended to imply no limitation on the essential scope of the invention.

EXAMPLE 1

This Example describes a typical process by which Component B of the composition of the invention may be prepared.

A four liter four-necked round-bottomed flask equipped with a stirrer, thermometer, condenser and addition funnel was charged with 43.45 g (0.70 mol) of ethylene glycol and 1.0 g of boron trifluoride in ether.

The reaction mixture was blanketed in nitrogen and the addition of 799 g (7.0 mole) of allyl glycidyl ether was begun. The addition took place over six hours at a temperature of 77°–79° C. After addition of 200, 400 and 600 ml of the allyl glycidyl ether the addition was stopped, the temperature was reduced to about 20° C., and a further 0.5 g of the boron trifluoride catalyst was added dropwise with stirring. Upon completion of each catalyst addition the reaction temperature was again raised to 77°–79° C. and the addition of allyl glycidyl ether was resumed.

When the addition has been completed the reaction mixture was stirred for a further 30 minutes at 80° C. before being allowed to cool to room temperature.

The mixture was then triturated with 50 ml. of saturated potassium carbonate solution to neutralize the residual catalyst and then taken up in ether. This solution was washed with saturated sodium sulfate solution until neutral and then dried over anhydrous sodium sulfate.

After filtration and removal of the ether solvent 842.5 g of the air-curing polymer were obtained representing a 99.7 percent yield based on the theoretical yield. The polymer was in the form of an essentially colorless, slight/moderate viscosity oil.

EXAMPLE 2

This Example illustrates the use of a polymerizable composition that is not a monomer but an unsaturated polymer, and more specifically a carboxylated styrene/butadiene copolymer available as a latex from Dow Chemical Co., under the trade description "D-620".

The oxidative prepolymer of Example 1 (0.68 g) was lightly air-bodied to a Gardner viscosity at 25° C. of F, added slowly to 46.0 g of a magnetically stirred latex of D-620 containing 49% solids. The mixture is stirred at room temperature for about four hours after which time, no oily separation occurred when the mixture was allowed to stand.

To this mixture were added 44 g. of deionized water and 2.0 g of a 5% aqueous solution of cobaltous acetate tetrahydrate.

The mixture was then sprayed onto Whatman #1 filter paper circles (12.5 cm diameter; 1.0 g in weight) using a technique permitting equal pickup on both sides.

The filter paper circles were dried at 120° C. in an air-circulating oven for 10 minutes and then kept at constant temperatures and humidity until tested.

Testing was performed on an Instron tensile tester and one inch strips were cut from each circle in the machine direction, from either side of the centerfold. Two dry tensile strength measurements were made on the two test strips and an average value was computed. The wet tensile strength samples were additionally soaked for 5 minutes in a 1.0 percent aqueous solution of a sodium ($C_{11}$–$C_{12}$) alkyl benzene sulfonate emulsifier, rinsed with water and lightly dried with a blotter.

To determine the water wicking time, a 0.10 ml. drop of water was placed on the horizontally positioned treated substrate at a temperature of 22° C. The time taken for the water drop to dissipate, as measured by loss of gloss, was taken. Generally a water wicking time of less than 30 seconds is indicative of hydrophilic character.

The treated filter papers showed excellent wet and dry strength, a fairly soft, satin-like handle and a water wicking time of about 19 seconds.

Air-bodying of the oxidative prepolymerizate prior to incorporation yielded similar results except that the water wicking time was reduced to 16 seconds.

By contrast, an identical treatment using the same mixture but omitting the oxidative prepolymerizate gave filter papers that were quite stiff and brittle and had a high dry tensile but little if any wet tensile strength. The water wicking time was about 50 seconds.

What is claimed is:

1. A polymer composition comprising:
(A) from 5 to 99.5 percent by weight of thermoplastic predominantly linear polymer comprising intralinear unsaturated linkages in the form of solid, stably dispersed latex particles; and (B) from 95 to 0.5 percent by weight of a liquid hydrophilic polymer having a backbone comprising at least one segment with the formula

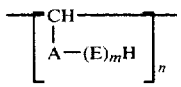

wherein A is a moiety terminating in the residue of an active hydrogen-containing group selected from the group consisting of alcoholic hydroxyl, thiol, amide, carboxylic acid and secondary amine with an active hydrogen removed, E is a moiety containing a radical having an activated olefinic unsaturation either $\alpha,\beta$ of $\beta,\alpha$ to the activating group; n is the number of adjacent segments having this formula and n and m are integers and are each at least one provided that where either is less than 4, the other is at least four; all weights being based on the total polymer weight in the composition.

2. A polymer composition according to claim 1 in which Component A is a diene based polymer.

3. A polymer composition according to claim 1 in which Component A is a carboxylated styrene/butadiene copolymer.

4. A polymer composition according to any of claims 1 to 3 in which Component B is the reaction product of a polyol with allyl glycidyl ether.

5. A polymer composition according to any of claims 1 to 3 in which Component B is the product of the reaction of a polyol and allyl glycidyl ether with at least four moles allyl glycidyl ether per hydroxyl group in the polyol.

6. A polymer composition comprising:
    (A) from 20 to 99 percent by weight of a rubbery thermoplastic polymer selected from the group consisting of polybutadiene, styrene/butadiene copolymer, and carboxylated version of such polymers in the form of an aqueous latex; and
    (B) from 80 to 1 percent by weight of a hydrophilic polymer obtained by the reaction of a polyol with at least 4 mols of allyl glycidyl ether per hydroxyl group in the polyol; all weights being based on the total polymer weight in the composition.

7. A polymer composition according to claim 6 which comprises a surfactant.

8. A polymer composition according to claim 6 which comprises an emulsion having from 5 to 40 percent by weight of polymer content.

9. A polymer composition according to claim 6 comprising polyvinyl alcohol as a viscosity modifier.

10. A cellulosic fibrous substrate treated with a polymer composition according to claim 1.

11. A cellulosic fibrous substrate treated with a polymer composition according to any of claims 6 to 9.

12. A air-laid cellulosic fiber mat treated with a polymer composition according to any of claims 6 to 9.

* * * * *